Patented Mar. 29, 1927.

1,622,534

UNITED STATES PATENT OFFICE.

PAUL I. MURRILL, OF PLAINFIELD, NEW JERSEY, ASSIGNOR TO R. T. VANDERBILT CO., INC., OF NEW YORK, N. Y., A CORPORATION OF NEW YORK.

ORGANIC SELENIUM COMPOUND AND METHOD OF MAKING THE SAME.

No Drawing. Application filed September 30, 1925. Serial No. 59,571.

This invention relates to new organic selenium compounds and to methods of making the same.

The new selenium compounds of the present invention contain the group —CSS— and are valuable vulcanizing agents and accelerators of vulcanization. The new compounds include selenium compounds of dithiocarbamic acids of the general formula $(RR'NCSS)_4Se$ where R and R' are simple or substituted hydrocarbon radicals which may be the same or different radicals, such as methyl, ethyl, phenyl, benzyl, etc., or in which RR'N represents piperidyl, etc., these compounds being organic selenium compounds containing nitrogen. The invention also includes organic selenium compounds containing oxygen of the general formula $(RO.CSS)_4Se$ where R has the meaning above mentioned, and also organic selenium compounds in which carbon is joined to the —CSS— radical of the general formula $(=C.CSS)_4Se$.

The new organic selenium compounds containing nitrogen are obtainable for example by the mixing of a soluble salt of a dithiocarbamic acid with a soluble selenite and thereafter adding an acid. The production of these compounds will be further described in the following more detailed description.

The sodium salt of diethyl dithiocarbamic acid may be first produced as follows, the parts being by weight:—

292 parts of diethylamine (4 mols.) are diluted with about 3500 parts of water, and 160 parts of caustic soda (4 mols.) added and dissolved while cooling to about 25° C. to prevent loss of amine. 304 parts of carbon bisulfide (4 mols.) are then added gradually with continued cooling and with stirring until dissolved. The final volume should conveniently be about 4000 parts which will contain about 683 parts (4 mols.) of sodium diethyl dithiocarbamate $Et_2NCSSNa$.

173.2 parts of anhydrous sodium selenite (1 mol.) are then dissolved in water and added to the above solution previously cooled by the addition of ice, and after thorough admixture, an amount of 10% hydrochloric acid containing about 219 parts (6 mols.) of actual hydrochloric acid, previously cooled with ice, is added gradually with stirring. Ice is added as needed to keep the temperature at about 10° C. or below. An orange-yellow precipitate forms immediately upon the addition of acid. This precipitate is usually resinous or gummy in character but hardens or solidifies on standing. The mother liquor at the end of the reaction is neutral or nearly so and the reaction appears to take place in accordance with the following equation:

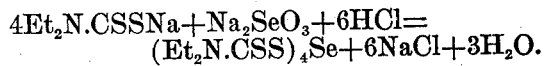

In the above specific example the proportions of reagents are in accordance with this equation, 4 mols of the sodium diethyldithiocarbamate being made to react with a mixture of one mol of sodium selenite and 6 mols of hydrochloric acid.

Instead of using hydrochloric acid, other acids, such as sulphuric or acetic, may be used. So also, free selenious acid may be used instead of the sodium selenite. Using sulphuric acid and selenious acid, the reaction is represented by the following equation:

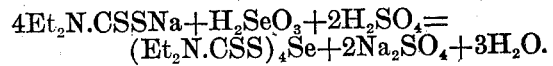

The product obtained in accordance with the above specific example is obtained in high yield, e. g. around 93% of the theoretical. The product obtained as above is extremely soluble in carbon bisulfide, and crystallizes readily on the addition of benzol. When thus crystallized from carbon bisulfide and benzol, or from benzol alone, it forms brilliant orange colored plates melting at about 94–95° C.

In a similar manner to that above described the selenium dimethydithiocarbamate may be obtained starting with dimethylamine instead of with diethylamine, and forming the sodium dimethlydithiocarbamate and causing it to react with sodium selenite and hydrochloric acid in the manner above described. This dimethyl derivative is a yellow product melting at about 163–165° C. and is very sparingly soluble in all of the usual organic solvents so that it is not readily obtainable in a pure crystalline form.

I have found that similar reactions take place, and similar new reaction products are formed, when the dithiocarbamate is replaced by a xanthate of the type $RO.CSSNa$ (where R represents a hydrocarbon radical) or by a dithioacetate or a dithiobenzoate, etc. of the type =C.CSSNa. The reaction between selenious acid, or the soluble selenites, with a soluble salt of a dithio acid and a mineral or organic acid appears to be a general one for various salts of the thio acids containing the —CSSH group attached to nitrogen, oxygen or carbon. Some of the products, however, are less stable than others and require more careful handling than in the case of the dithiocarbamates.

The new organic selenium compounds, as will be seen, are characterized by containing the —CSS— group, and more particularly by possessing the general formula $Se(SSC—)_4$.

While I have referred to certain of the new organic selenium compounds, e. g., as selenium dialkyl dithiocarbamates, these new organic selenium compounds are not metallic salts of the dialkyl dithiocarbamic acids and are distinguished from the metallic salts of such acids. Selenium itself is not a metal and differs from the metals in its properties and reactions. It is itself a vulcanizing agent and somewhat analogous to sulfur in its properties. Furthermore, the metallic salts of the dithio acids, while they are accelerators of vulcanization, are not vulcanizing agents, whereas the new organic selenium compounds of the present invention are themselves valuable vulcanizing agents, as well as accelerators of vulcanization. They appear to give up both sulfur and selenium during the vulcanization of rubber therewith. The new compounds are also valuable accelerators of vulcanization when used with additional sulphur. When used without additional sulphur they can be used, e. g. to the extent of 2 to 3% by weight of the rubber. When used as accelerators of vulcanization agents, with additional sulphur, e. g. with 4% on the rubber, they may be used for example to the extent of ⅛ to ¼% by weight of the rubber.

It will thus be seen that the invention provides new organic selenium compounds of the general character and composition above described, as well as a new process of producing these compounds. For example, in the case of the selenium dithiocarbamates, the sodium salt of the dialkyldithiocarbamic acid may be caused to react with selenious acid or a soluble selenite such as sodium selenite, and with an acid such as hydrochloric acid in the proportions above described. The invention includes the new products as well as the new process of producing them.

I claim:

1. As new products, organic selenium compounds containing the following group: —CSS—.

2. As new products, organic selenium compounds of the following general composition: $Se(SSC—)_4$.

3. As new products, organic selenium compounds having the following general formula: $(RR'NCSS)_4Se$, where R and R' are hydrocarbon radicals.

4. As a new product, selenium diethyl dithiocarbamate.

5. As a new product, selenium dialkyl dithiocarbamate.

6. The method of producing organic selenium compounds containing the —CSS— group which comprises causing the selenious acid radical to react with a soluble salt of a dithio acid and an acid.

7. The method of producing selenium dialkyl-dithiocarbamates which comprises causing the selenious acid radical and an acid to react with a soluble salt of a dialkyl-dithiocarbamate.

8. The method of producing selenium dialkyl-dithiocarbamates which comprises causing sodium selenite and an acid to react with sodium diethyl-dithiocarbamate.

9. The method of producing selenium dialkyl-dithiocarbamates which comprises causing one mol. of sodium selenite and 6 mols of acid to react with 4 mols of sodium dialkyl-dithiocarbamate with cooling of the reaction mixture during the reaction.

In testimony whereof I affix my signature.

PAUL I. MURRILL.